3,439,902
MIXER FOR CONTINUOUSLY TREATING ONE OR MORE GRANULAR OR PULVERULENT MATERIALS WITH ONE OR MORE ATOMIZED SUBSTANCES
Lourens B. van Munster, De Zilk, Netherlands, assignor to Vometic N.V., Haarlem, Netherlands
Filed May 26, 1967, Ser. No. 654,669
Claims priority, application Netherlands, June 3, 1966, 6607707
Int. Cl. B28c 5/06; B01f 15/02
U.S. Cl. 259—151                                14 Claims

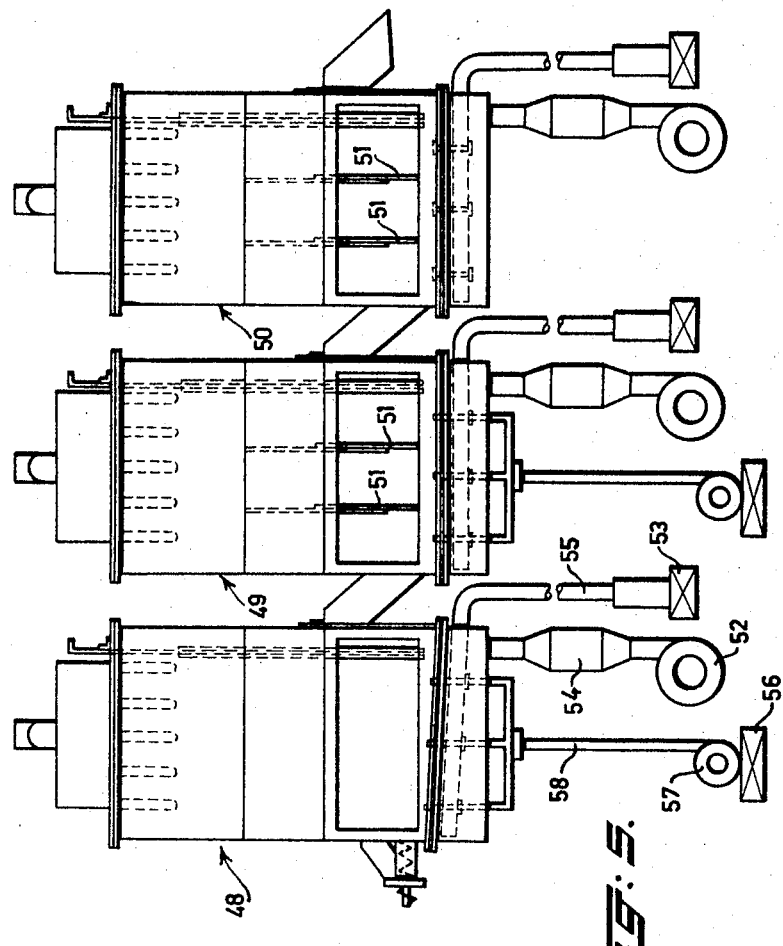

ABSTRACT OF THE DISCLOSURE

A mixer or a plurality of mixers connected in series with respect to the flow of material to be treated in said mixers, each mixer comprising a mixing chamber opening at its top side into an expansion chamber a vertical partition dividing said chambers into a first and second compartment interconnected via an aperture between the bottom of said partition and the gas-permeable bottom of the mixing chamber, means to fluidize the granular or pulverulent material introduced into said mixing chamber on both sides of said partition, means to direct at least one substance into said second compartment in an atomized form, an outlet for the treated material arranged in said first compartment at a level above that of said bottom of said partition and gas outlets leading gas out of said second compartment.

---

Figure 1:
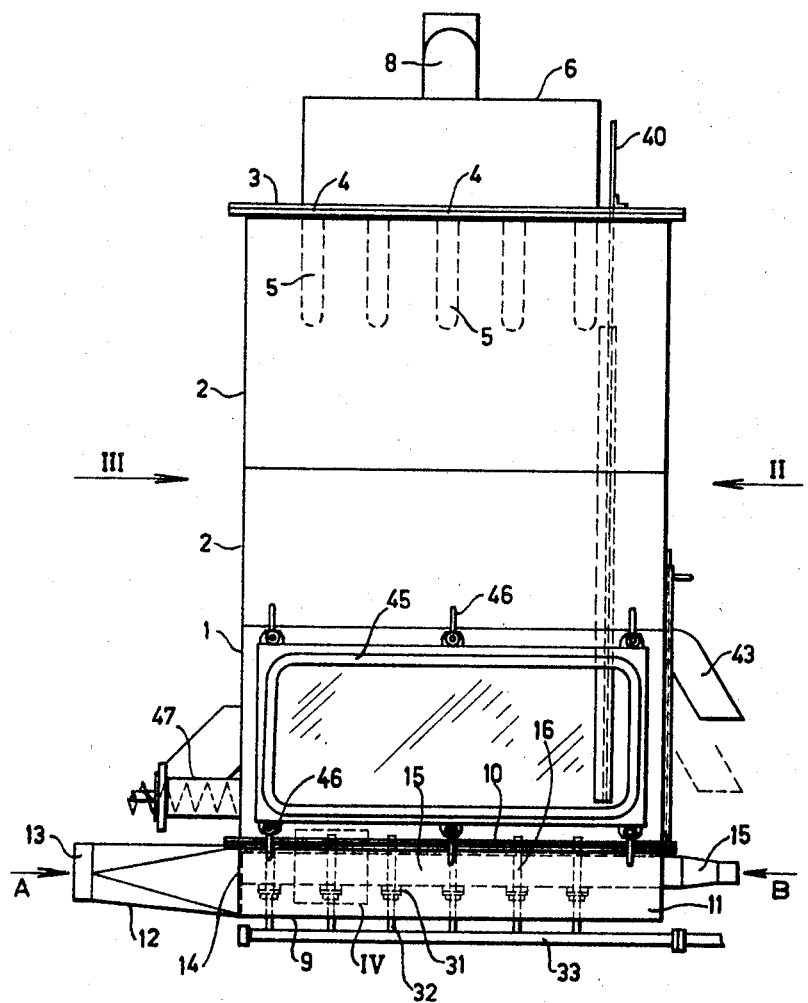

This invention relates to a mixer for continuously treating one or more granular or pulverulent materials with one or more other solid, liquid or gaseous substances.

According to the present invention, there is provided a mixer for continuously treating with a substance a granular or pulverulent material, comprising a mixing chamber closed at its bottom by a gas-permeable plate which serves to support said material, an expansion chamber which is above said mixing chamber and into which said mixing chamber opens, one or more gas outlets of said expansion chamber leading from an upper part of said expansion chamber, one or more nozzles arranged to direct said substance upwardly into said mixing chamber, a low-pressure chamber below said plate and bounded by said plate for supplying low-pressure gas through said plate to said mixing chamber to fluidize said material, a partition extending downwardly from said upper part to the region of said plate and dividing said expansion chamber and said mixing chamber into first and second compartments, which are interconnected, via an aperture between said plate and the bottom of said partition, to permit flow of the fluidized material therebetween when the mixer is in use, and an outlet for the treated material leading from said first compartment at a level above that of said bottom of said partition, the nozzles and the gas outlet, directing said substance into, and leading gas out of, said second compartment.

In the operation of the present mixer, the introduced granular or pulverulent material forms a bed which is fluidized to such an extent by the gas stream introduced through the permeable plate that the bed behaves like a turbulent liquid, while by means of the nozzle, the substance is sprayed in fine particles on a high-velocity gas stream into the mixing chamber, the fine particles together with portions of the granular or pulverulent material drawn in succession out of the fluidized bed by the high-velocity gas stream moving upwardly into the expansion chamber and mixing thoroughly with each other. Since in the expansion chamber the velocity of the high-velocity gas stream is quickly reduced, the particulate matter in the gas stream returns to the turbulent bed, and thus the whole of the fluidized bed is subjected to this circulation process many times within a certain period. The vertical spacing between the treated-material outlet and the permeable plate is decisive in determining the depth of the bed, which depth can thus be kept constant irrespective of the extent to which the substance is supplied. One of the factors which enables this result to be obtained is that the material at one side of the partition is in the same state of fluidization as the material at the other side of the partition. The maintenance of a previously calculated depth of the bed has been found to be of great importance in the operation of the mixer. The partition prevents the particulate matter blown into the expansion chamber from passing almost directly from the expansion chamber into the treated-material outlet. This has also been found to be of importance in obtaining as homogeneous a final product as possible. Since normally the particulate matter blown into the expansion chamber does not penetrate as far as the top of the expansion chamber, it is preferable, but not essential that the partition extends up to the top of the expansion chamber. In order to allow adjustment of the depth of the bed in the mixing chamber, and/or of the height of the aperture, the partition and/or the treated-material outlet are vertically adjustable. Adjusting the outlet when per unit time a fixed amount of the material is supplied will influence the time during which the material remains in the mixing chamber. For regulating the time during which the granular or pulverulent material stays in the mixing chamber, the mixer can be fitted with a regulating device connected in a material inlet of the mixing chamber so that, per unit time, a definite amount of a granular or pulverulent material is introduced into the mixing chamber. Since, in many processes, the supplied quantities of a substance or substances to be atomised should be regulated, in one or more supply pipes for the substance to be sprayed a regulating device e.g. a pump, is arranged to supply a definite amount of that substance to the nozzle per unit time.

The, or each, gas outlet from the expansion chamber is preferably covered by a dust catcher, for instance a fabric which is permeable to gas. In this case, the expansion chamber is connected in a gas-tight way to an outlet chamber, the outlet chamber being connected by a suction pipe to a suction device, for instance a fan, fitted with a regulating device controlled by the pressure in the expansion chamber part of the second compartment in such manner that this pressure is maintained at a previously determined value, preferably at atmospheric pressure.

Figure 2:
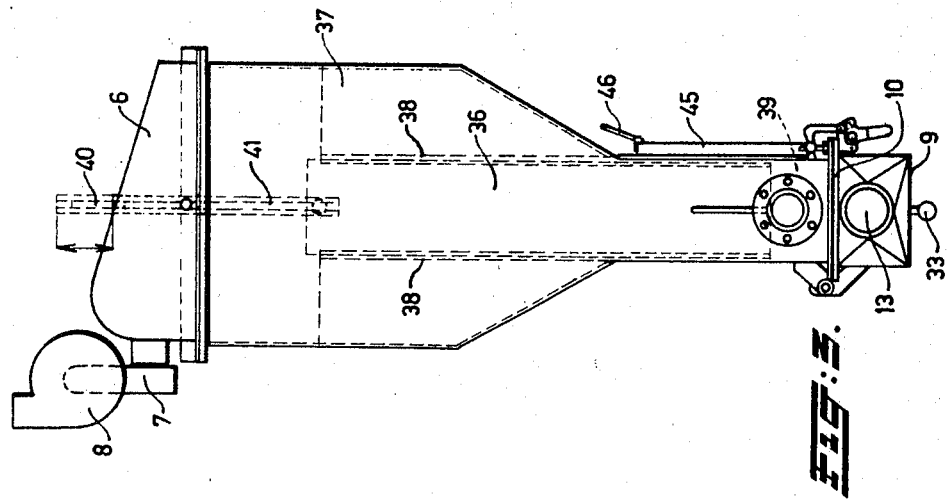
Figure 3:
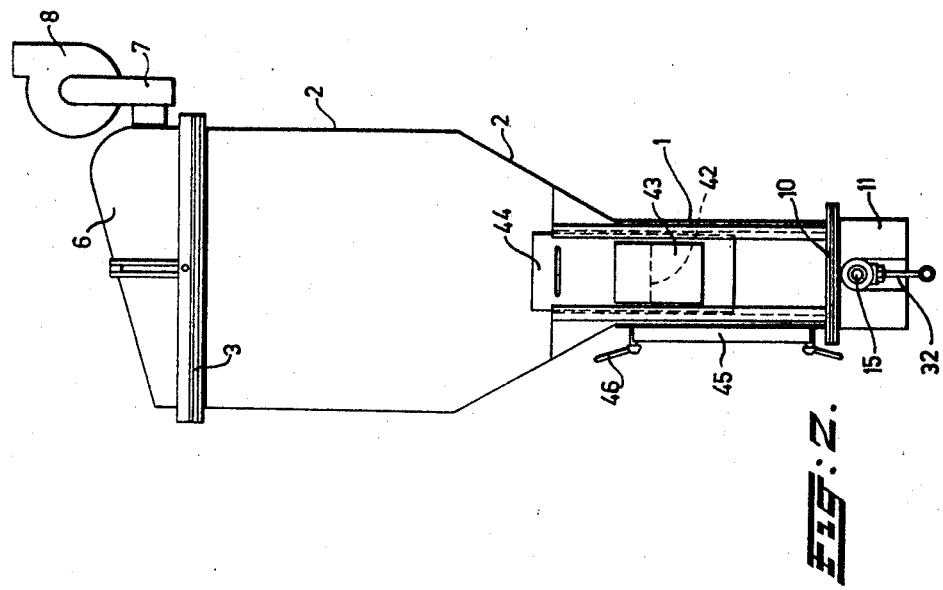
Figure 4:
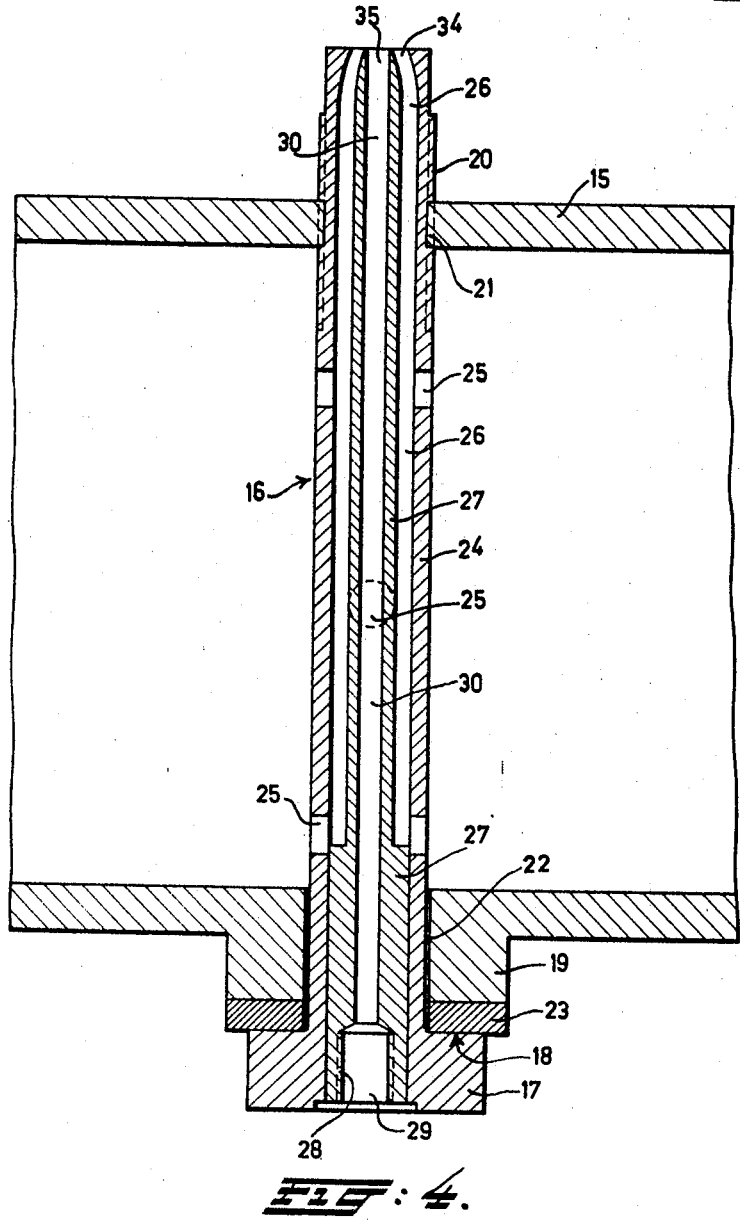

For a better understanding of the invention and to show how the same may be carried into effect, reference will now be made, by by way of example, to the accompanying drawings, in which:

FIGURE 1 is a side elevation of a mixer for continuously treating a granular or pulverulent material, FIGURE 2 is an end elevation of the mixer taken in the direction of the arrow II in FIGURE 1, FIGURE 3 is an opposite end elevation taken in the direction of the arrow III in FIGURE 1, FIGURE 4 shows to a larger scale a longitudinal vertical section of the detail IV in FIGURE 1, and FIGURE 5 is a side elevation of three mixers in combination.

Referring to FIGURES 1 to 4, the mixer includes a mixing chamber 1 of which the open top communicates with a wider expansion chamber 2, the latter being shaped in the manner of a hopper. The expansion chamber 2 has at its top a closure plate 3 provided with gas outlets 4. In the expansion chamber 2 each gas outlet 4 is covered by a dust catcher 5 consisting of a fabric which is permeable only to gas. Mounted on the plate 3 is an outlet chamber 6 connected in an air-tight manner to the plate 3. This outlet chamber 6 communicates through a suction pipe 7 with a suction fan 8. The fan 8 is provided with regulating means (not shown) so that the suction thereof is regulated as a function of the pressure prevailing in the expansion chamber 2, to keep that pressure at a constant value.

The mixing chamber 1 is closed at its bottom by a gas-permeable plate 10 bounding the top of an inlet chamber 11 which is in direct communication with a fixed stub pipe 12, the circular inlet 13 of the stub pipe gradually merging into the rectangular outlet 14 thereof. Connected to this stub pipe 12 is a feed pipe (not shown) through which a low-pressure gas, e.g., air, is supplied from a compressor (not shown) in the direction of the arrow A in FIGURE 1. This gas, which has been heated or cooled if necessary, passes through the permeable plate 10 into the mixing chamber 1 to fluidize a bed of granular or pulverulent material introduced into the mixing chamber 1, so that this bed behaves as a turbulent liquid. A feed pipe 15 extends in an air-tight manner into the chamber 11, and has connected thereto a feed pipe (not shown) through which a high-pressure gas can be passed by means of a second compressor (not shown) in the direction of the arrow B. This gas also can previously have been heated or cooled. The end of the pipe 15 extending into the inlet chamber 11 is closed and the high-pressure gas can escape only through nozzles 16. These nozzles 16 protrude vertically through the pipe 15, and the plate 10, and the axis of each nozzle is preferably situated in the vertical longitudinal central plane of the pipe 15. The end of each nozzle opposite to the spray apertures thereof is provided with a broadened head 17 having a flat top abutment face 18 (see FIGURE 4). The pipe 15 has at each mounting location for a nozzle 16 a downward projection 19 with a flat bottom abutment face. In the proximity of its spray apertures, each nozzle is provided with an external screw-thread 20 corresponding to an internal screw-thread of a vertical bore 21 provided in the top of the pipe 15. The bore 21 is co-axial with a non-threaded bore 22 provided in the bottom of the pipe 15 and in the corresponding projection 19. It will be clear that each nozzle 16 can be freely inserted through the lower bore 22 and then be screwed into the bore 21 until the broadened head 17 bears on the projection 19 at an air-tight packing ring 23 on the bottom of projection 19. Consequently, the high-pressure gas supplied to the pipe 15 can escape only through radial apertures 25 provided in an outer tube 24 of each nozzle 16, and then flows at high velocity through an outer passage 26 of the nozzle. This passage 26 is defined radially upwardly by the outer tube 24 and the wall of an inner co-axial tube 27. At its end remote from the spray apertures the inner tube 27 has a bore 29 provided with an internal screw thread 28, this bore 29 leading to an inner passage 30. Overflow sockets 31 of respective branch pipes 32 connected to a supply pipe 33 and extending through the bottom wall 9 of the chamber 11 are screwed into the bores 29. Through this pipe 33 the substance is supplied which is to take part in the process after being atomized. It is obvious that the substance supplied through the passage 30 and entrained at the outlet aperture 35 of the passage 30 by the high-pressure gas stream flowing through the passage 26 and from outlet openings 34 of the passage 26 is thus atomized as it enters the mixing chamber 1.

A vertical partition extends from a location spaced below the plate 3 and in the upper part of the chamber 2 to a location spaced above the plate 10 and in the chamber 1, and divides the mixing chamber 1 and the expansion chamber 2 into two compartments. A movable part 36 of this partition which especially divides the mixing chamber 1 is slidable in vertical guides 38 mounted in fixed parts 37 thereof fixedly secured in the expansion chamber 2. In this way, it becomes possible to adjust the height of the aperture 39 between the bottom of the partition and the porous plate 10 to any desired value between a minimum and a maximum. A handle 40 projecting through the plate 3 is secured to the part 36 for this purpose. The handle is flat and runs in guides 41, the corresponding hole in the plate 3 being air-tight. In other cases, the partition can extend as far as the plate 3, but this is not absolutely necessary. However, in any case the partition prevents an overflow of the particulate matter from the expansion chamber 2 almost directly into a treated-material outlet 42 constituted by the mouth of an outlet pipe 43. The outlet pipe 43 is fixed on a slide 44 which is vertically adjustable. The handle 40 and the slide 44 are provided with locking means (not shown) to lock them in adjusted position. The mixing chamber 1 is provided with a detachable glass cover 45 which by means of six handles 46 can be mounted in an air-tight manner, and is also provided with a regulating device 47 of a known kind of which only the material feeding worm is shown. It can be seen that all of the nozzles 16 and all of the outlets 4 are associated with the larger compartment which is one side of the partition, and the outlet 42 is associated with the smaller compartment, which is to the other side of the partition.

Although for certain processes the nozzles of a single mixer may be individually or groupwise connected with more than a plurality of feed pipes for the supply of various substances which, after atomisation, take part in the processs, two or more mixers may also be interconnected in series, each mixer being constructed in principle similarly to the mixer already described. Such a combination of mixers is shown in FIGURE 5, in which a mixer 48 has a gas-permeable plate sloping from the material inlet towards the material outlet side of the mixing chamber, thereby to increase the tendency of the bed to flow towards the material outlet side. Moreover, the material outlet pipe of the mixer 48 serves at the time as the material inlet pipe for a mixer 49, while the material outlet pipe of the mixer 49 serves as the material inlet pipe for a mixer 50. In addition to the main partition dividing the mixing chamber and the expansion chamber into two compartments, each of the mixers 49 and 50 is provided with two shorter, auxiliary partitions 51 the bottoms of which are also spaced above the permeable plate of the mixing chamber. Thus the larger part of each mixing chamber to one side of the main partition is divided by the partitions 51 into three sub-compartments each provided with its own nozzle to introduce into each sub-compartment the substance in an atomized form. There are shown diagrammatically in FIGURE 5 for each of the mixers 48, 49 and 50 two compressors 52 and 53, respectively connected to the supply pipes 54 and 55, and serving to supply the low-pressure gas and the high-pressure gas. Moreover, each of the mixers 48 and 49 is provided with a storage tank 56 for the substance to be introduced by way of the nozzles, the tank 56 being connected with the corresponding nozzles by way of a metering apparatus 57 and a supply pipe 58. In this embodiment, the mixer 50 is used as a cooling or drying apparatus and thus has none of the parts 56 to 58, the nozzles in this mixer 50 being closed temporarily by means of screw caps arranged at both ends of the nozzles.

In a modification of the combination of FIGURE 5, the gas outlet chambers of the three mixers are interconnected in a gas-tight manner and are connected to a single suction fan via a single suction pipe, the suction fan being controlled by a single pressure-responsive regulating device.

I claim:
1. A mixer for continuously treating a granular or pulverulent material with a substance, comprising a mixing chamber closed at its bottom by a gas-permeable plate which serves to support said material, an expansion chamber which is above said mixing chamber and into which said mixing chamber opens, a gas outlet leading from the upper part of said expansion chamber, a nozzle arranged to direct said substance upwardly into said mixing chamber, a low-pressure inlet chamber below said plate and bounded by said plate for supplying low-pressure gas through said plate to said mixing chamber to fluidize said material, a partition extending downwardly from said upper part to the region of said plate and dividing said expansion chamber and said mixing chamber into first and second compartments, which are interconnected, by an aperture between said plate and the bottom of said partition, to permit flow of the fluidized material therebetween when the mixer is in use, and an outlet for the treated material leading from said first compartment at a level above that of said bottom of said partition, said nozzle directing said substance into, and said gas outlet leading gas out of, said second compartment.

2. A mixer as claimed in claim 1, wherein said bottom of said partition is upwardly and downwardly adjustable.

3. A mixer as claimed in claim 1 and further comprising an inlet for said material leading to the mixing chamber part of said second compartment and a regulating device connected in said inlet for regulating the rate of supply of said material to said mixing chamber part.

4. A mixer as claimed in claim 1, and further comprising a feed pipe connected to said nozzle for supplying said substance thereto, and a regulating device connected in said feed pipe for regulating the rate of supply of said substance to said nozzle.

5. A mixer as claimed in claim 4, wherein said regulating device connected in said feed pipe is a pump.

6. A mixer as claimed in claim 1, wherein said plate slopes downwardly towards the treated-material outlet side of the mixing chamber.

7. A mixer as claimed in claim 1, and further comprising an outlet chamber to which the gas outlet leads, gas cleaning means covering the gas outlet, a suction device connected downstream of said outlet chamber, and a regulating device under the influence of gas pressure in said second compartment arranged to control said suction device as a function of that pressure in such manner as to maintain that pressure substantially constant.

8. A mixer claimed in claim 7, wherein said regulating device under the influence of gas pressure in said second compartment is arranged to control said suction device in such manner as to maintain said gas pressure substantially atmospheric.

9. A mixer as claimed in claim 1, and further comprising one or more shorter, an auxiliary partition arranged in said second compartment ahead of the first-mentioned partition in the direction of said outlet for the treated material, the auxiliary partition extending from the upper part of said mixing chamber to the region of said plate and dividing said mixing chamber part of said second compartment into sub-compartments, which are interconnected, by an aperture between said plate and the bottom of that auxiliary partition, to permit flow of the fluidized material therebetween when the mixer is in use, there being one nozzle as aforesaid associated with each such sub-compartment.

10. A mixer as claimed in claim 1 wherein said outlet for treated material is vertically adjustable.

11. The mixer defined in claim 1 further comprising a second mixer connected in series therewith so that said outlet for the treated material leads from said first compartment to the mixing chamber of said second mixer.

12. A combination as claimed in claim 11, and further comprises an outlet chamber to which leads the gas outlet of the mixer, and gas cleaning means covering the gas outlet of the mixer, there being a suction device common to, and connected downstream of, the outlet chambers of the mixers, and a regulating device under the influence of gas pressure in the second compartments of the mixers arranged to control said suction device in dependence on that pressure in such manner as to maintain that pressure substantially constant.

13. A combination as claimed in claim 12, wherein the material outlet of each mixer but the last in said series leads downwardly to a material inlet of the next following mixer in the series.

14. A combination as claimed in claim 13, wherein the last mixer in the series serves to cool or dry the material.

References Cited

UNITED STATES PATENTS

| | | | |
|---|---|---|---|
| 2,723,838 | 11/1955 | Peters | 259—4 |
| 3,159,383 | 12/1964 | Munster | 259—4 |
| 3,179,378 | 4/1965 | Zenz | 259—151 |

ROBERT W. JENKINS, *Primary Examiner.*

U.S. Cl. X.R.

259—4